(12) United States Patent
Hasegawa

(10) Patent No.: US 7,193,401 B1
(45) Date of Patent: Mar. 20, 2007

(54) CONTROL CIRCUIT AND CONTROL METHOD FOR DC-DC CONVERTER

(75) Inventor: Morihito Hasegawa, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/374,196

(22) Filed: Mar. 14, 2006

(30) Foreign Application Priority Data

Dec. 7, 2005 (JP) .............................. 2005-353795

(51) Int. Cl.
*G05F 1/40* (2006.01)
(52) U.S. Cl. .................... 323/283; 323/224; 323/237; 323/241
(58) Field of Classification Search ................ 323/283, 323/224, 237, 241
See application file for complete search history.

(56) References Cited

U.S. PATENT DOCUMENTS

RE38,940 E * 1/2006 Isham et al. ................. 323/224

FOREIGN PATENT DOCUMENTS

| JP | 2002-223562 | 8/2002 |
|---|---|---|
| JP | 2005-143197 | 6/2005 |

* cited by examiner

*Primary Examiner*—Shawn Riley
(74) *Attorney, Agent, or Firm*—Arent Fox PLLC

(57) ABSTRACT

It is an object of the present invention to provide a control circuit and a control method for a current mode control type DC—DC converter capable of preventing a subharmonic oscillation even if an on-duty is not less than 50% and capable of preventing a switching frequency from fluctuating depending on an input voltage. When a high-level output signal Vo1 is inputted to a reset input terminal R of a flip-flop FF, a transistor FET1 is turned off. A phase comparator FC outputs a comparison result signal CONT in accordance with a phase difference between a delay signal FP and a reference signal FR. A delay circuit DLY outputs a high-level delay signal FP after the passage of a delay time DT adjusted in accordance with the comparison result signal CONT from the turn-off of the transistor FET1. The transistor FET1 is turned on in accordance with an input of the high-level delay signal FP.

9 Claims, 9 Drawing Sheets

CIRCUIT DIAGRAM OF DC-DC CONVERTER 1

FIG. 1  CIRCUIT DIAGRAM OF DC-DC CONVERTER 1

FIG. 2  CIRCUIT DIAGRAM OF PHASE COMPARATOR FC

FIG. 3 CIRCUIT DIAGRAM OF DELAY CIRCUIT DLY

FIG. 4 TIMING CHART OF CURRENT MODE CONTROL TYPE DC-DC CONVERTER

FIG. 5  TIMING CHART OF DC-DC CONVERTER 1 (NO. 1)

FIG. 6 TIMING CHART OF DC-DC CONVERTER 1 (NO. 2)

FIG. 8 CIRCUIT DIAGRAM OF DC-DC CONVERTER 1A

CIRCUIT DIAGRAM OF CURRENT MODE DC-DC CONVERTER 100 OF FIXED OFF-TIME CONTROL

CONTROL CIRCUIT AND CONTROL METHOD FOR DC-DC CONVERTER

CROSS-REFERENCE TO RELATED APPLICATIONS

This application is based upon and claims the benefit of priority from each of the prior Japanese Patent Application No. 2005-353795 filed on Dec. 7, 2005, the entire contents of which are incorporated herein by reference.

BACKGROUND OF THE INVENTION

1. Field of the Invention

The present invention relates to a control circuit and a control method for a current mode control type DC—DC converter, more particularly, it relates to the prevention of a subharmonic oscillation occurring when an on-duty exceeds 50%.

2. Description of Related Art

FIG. 9 is a circuit diagram of a current mode DC—DC converter 100 of fixed off-time control. When a main switching transistor FET1 is turned on, an inductor current flowing through a choke coil L1 is increased. When the inductor current fed back via an input terminal FB1 becomes larger than an error amplification signal Vc, the transistor FET1 is turned off only for a fixed time. After the fixed off-time, the transistor FET1 is turned on again.

Moreover, Japanese unexamined patent publication Nos. 2002-223562 and 2005-143197 are disclosed as related art with the above.

SUMMARY OF THE INVENTION

However, in a DC—DC converter 100, though an off-time of a transistor FET1 is fixed, an on-time depends on a ratio of an input voltage Vin to an output voltage Vout. Thereupon, a problem is caused that a switching frequency of the transistor FET1 fluctuates depending on the input voltage Vin.

A start of an on-cycle of the transistor FET1 of the DC—DC converter 100 is performed after the fixed off-time ends. That is, even if a load applied to the DC—DC converter 100 is suddenly increased, the transistor FET1 cannot be turned on until the off-time of the DC—DC converter 100 ends. Thereupon, a problem is caused that a response delay of the DC—DC converter 100 to a sudden fluctuation of the load is generated.

In order to resolve at least one of the problems of the above-described background arts, the present invention was made, and it is an object of the present invention to provide a control circuit and a control method for a DC—DC converter capable of preventing a reduction of an output current and preventing a subharmonic oscillation of a coil current even in an area in which an on-duty exceeds 50%.

To achieve the purpose above, there is provided a control circuit of a current mode control type DC—DC converter that controls a main switching transistor in accordance with a clock signal, comprising: a timing adjustment circuit that outputs a timing signal for determining a timing for shifting the main switching transistor from a second state to a first state; and a phase comparator that detects a phase difference between the timing signal and the clock signal to output a phase difference signal to the timing adjustment circuit in accordance with the phase difference, wherein the timing adjustment circuit prolongs a delay time after the main switching transistor shifts from the first state to the second state until the timing adjustment circuit outputs the timing signal in accordance with an advance amount of a phase when the phase of the timing signal is more advanced than a phase of the clock signal, and the timing adjustment circuit shortens the delay time in accordance with a delay amount of a phase when the phase of the timing signal is delayed behind a phase of the clock signal.

When a first state is a conductive state, a second state is a non-conductive state and a main switching transistor shifts from the first state to the second state in accordance with that an inductor current value becomes higher than a set value, a so-called fixed off-time type current mode control system DC—DC converter is constituted. On the other hand, when the first state is a non-conductive state, the second state is a conductive state and the main switching transistor shifts from the first state to the second state in accordance with that an inductor current value becomes lower than the set value, a so-called fixed on-time type current mode control system DC—DC converter is constituted.

A timing adjustment circuit outputs a timing signal for determining a timing for shifting the main switching transistor from the second state to the first state. A phase comparator detects a phase difference between the timing signal and a clock signal to output a phase difference signal in accordance with the phase difference to the timing adjustment circuit.

A time after the main switching transistor shifts from the first state to the second state until the timing adjustment circuit outputs the timing signal is defined as a delay time. The phase comparator detects that a phase of the timing signal is more advanced than a phase of the clock signal in a certain switching period to determine that a period of the timing signal is shorter than a period of the clock signal. And then, the phase comparator transmits this determination to the timing adjustment circuit via a phase difference signal. Accordingly, the timing adjustment circuit prolongs a delay time in accordance with an advance amount of the phase to prolong the period of the timing signal from the succeeding next switching period. Similarly, when a phase of the timing signal is delayed behind a phase of the clock signal in a certain switching period, the phase comparator determines that a period of the timing signal is longer than a period of the clock signal to transmit this determination to the timing adjustment circuit via a phase difference signal. Accordingly, the timing adjustment circuit shortens the delay time in accordance with a delay amount of the phase to shorten the period of the timing signal from the succeeding next switching periods. As described above, a feed-back control of the delay time is performed by the phase comparator and the timing adjustment circuit.

First, a delay time in the current switching period is thus determined in accordance with a phase difference between a timing signal and a clock signal in a period before the current switching period. Accordingly, a phase difference between a timing signal and a clock signal generated in the current switching period does not have an influence on the delay time in the current switching period. And then, an inductor current value when the second state in the current switching period ends is made substantially equal to an average value of an inductor current value when the second state in the previous switching period ends. That is, a disturbance of an inductor current generated by a load fluctuation in the current switching period can be prevented from transmitting to the succeeding switching periods. Thus, a subharmonic oscillation can be prevented in the control circuit of the current mode control type DC—DC converter operating at a fixed frequency even if an on-duty is not less than 50%.

Secondly, the delay time can be adjusted so that a period of the clock signal corresponds to a period of the timing signal and that the phase difference between the clock signal and the timing signal becomes zero. Accordingly, a switching period of the DC—DC converter equipped with the control circuit of the DC—DC converter according to the present invention can be made to synchronize with the clock signal. Thus, a switching frequency of the main switching transistor can be prevented from fluctuating depending on the input voltage.

Furthermore, a control method for a current mode control type DC—DC converter of the invention for controlling a main switching transistor in accordance with a clock signal, comprises the steps of: detecting a phase difference between a shift timing when the main switching transistor shifts from a second state to a first state and the clock signal; shifting the main switching transistor from the first state to the second state in accordance with that an inductor current exceeds a set value after the shift of the main switching transistor to the first state; and delaying the shift timing in accordance with an advance amount of a phase when the phase of the previous shift timing is more advanced than a phase of the clock signal, and bringing the shift timing forward in accordance with an advance amount of a phase when the phase of the previous shift timing is delayed behind a phase of the clock signal, at the subsequent determination of the shift timing.

A step for detecting a phase difference detects a phase difference between a shift timing, in which the main switching transistor shifts from the second state to the first state, and a clock signal. A step for shifting the main switching transistor from the first state to the second state is performed after the step for detecting a phase difference. The shift is performed in accordance with that an inductor current value exceeds the set value. A step for adjusting the shift timing is performed after the step for shifting the main switching transistor from the first state to the second state. When a phase of the previous shift timing is more advanced than the phase of the clock signal, a shift timing is delayed in accordance with an advance amount of the phase. On the other hand, when a phase of the previous shift timing is delayed behind a phase of the clock signal, a shift timing is brought forward in accordance with an advance amount of the phase.

A feed-back control of the shift timing is performed by the above-described steps. First, a subharmonic oscillation can be thus prevented in the control circuit of the current mode control type DC—DC converter operating at the fixed frequency even if an on-duty is not less than 50%. And secondly, a switching frequency of the main switching transistor can be prevented from fluctuating depending on the input voltage.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 8 is a circuit diagram of a DC—DC converter 1a.

DETAILED DESCRIPTION OF THE PREFERRED EMBODIMENTS

A DC—DC converter 1 according to a first embodiment of the present invention will be explained with reference to FIG. 1. The DC—DC converter 1 includes a control section 3, a choke coil L1, a main switching transistor FET1, a synchronous rectification transistor FET2, a smoothing capacitor C1 and a current sense resistor Rs.

Figure 1:
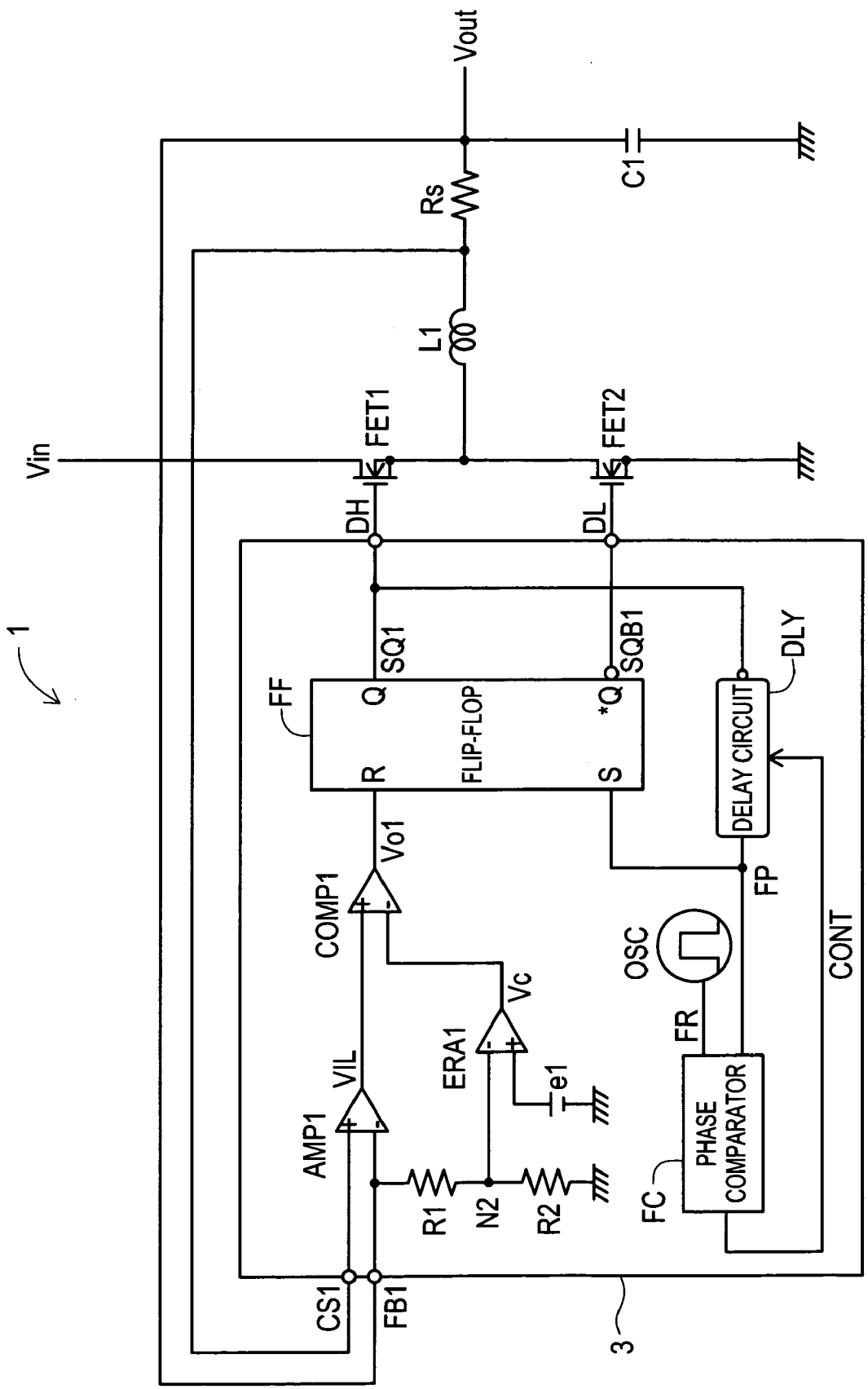
FIG. 1 is a circuit diagram of a DC—DC converter 1.

In FIG. 1, an input voltage Vin is connected to an input terminal of the transistor FET1, and an input terminal of the choke coil L1 is connected to an output terminal of the transistor FET1. An output voltage Vout is outputted from an output terminal of the choke coil L1. An output terminal DH of the control section 3 is connected to a control terminal of the transistor FET1. An input terminal of the transistor FET2 as a synchronous rectification switch circuit is grounded, and an output terminal thereof is connected to the input terminal of the choke coil L1. An output terminal DL of the control section 3 is connected to a control terminal of the transistor FET2. The smoothing capacitor C1 is connected between the output terminal of the choke coil L1 and a ground. The output terminal of the choke coil L1 is connected to an input terminal FB1 of the control section 3.

The control section 3 includes a voltage amplifier AMP1, an error amplifier ERA1, a voltage comparator COMP1, a flip-flop FF, an oscillator OSC, a phase comparator FC and a delay circuit DLY. An output voltage Vout of the DC—DC converter applied to the FB1 terminal of the control section 3 is divided at a connection node N2 of an input resistor R1 and a ground resistor R2 which are connected in series between the FB1 terminal and the ground. A divided voltage at the node N2 is inputted to an inverting input terminal of the error amplifier ERA1. A reference voltage e1 from the ground is inputted to a non-inverting input terminal of the error amplifier ERA1. An error amplification signal Vc outputted from the error amplifier ERA1 is inputted to an inverting input terminal of the voltage comparator COMP1. An input terminal CS1 is connected to a non-inverting input terminal of the voltage amplifier AMP1 and the input terminal FB1 is connected to an inverting input terminal of the Voltage amplifier AMP1 in order to measure a voltage drop generated by a current flowing through the current sense resistor Rs. An inductor current signal VIL outputted from the voltage amplifier AMP1 is inputted to a non-inverting input terminal of the voltage comparator COMP1. An output signal Vo1 outputted from the voltage comparator COMP1 is inputted to a reset input terminal R of the flip-flop FF. A non-inverting output terminal Q of the flip-flop FF is connected to the transistor FET1 via the output terminal DH of the control section 3. A non-inverting output terminal *Q of the flip-flop FF is connected to the transistor FET2 via the output terminal DL of the control section 3. An output terminal of the delay circuit DLY is connected to and a delay signal FP is inputted to one input terminal of the phase comparator FC. An output terminal of the oscillator OSC is connected to and a reference clock signal FR is inputted to the other input terminal of the phase comparator FC. An output terminal of the phase comparator FC is connected to and a comparison result signal CONT outputted from the phase comparator FC is inputted to the delay circuit DLY. The delay signal FP outputted from the delay circuit DLY is inputted to a set input terminal S of the flip-flop FF and to the phase comparator FC.

Figure 2:
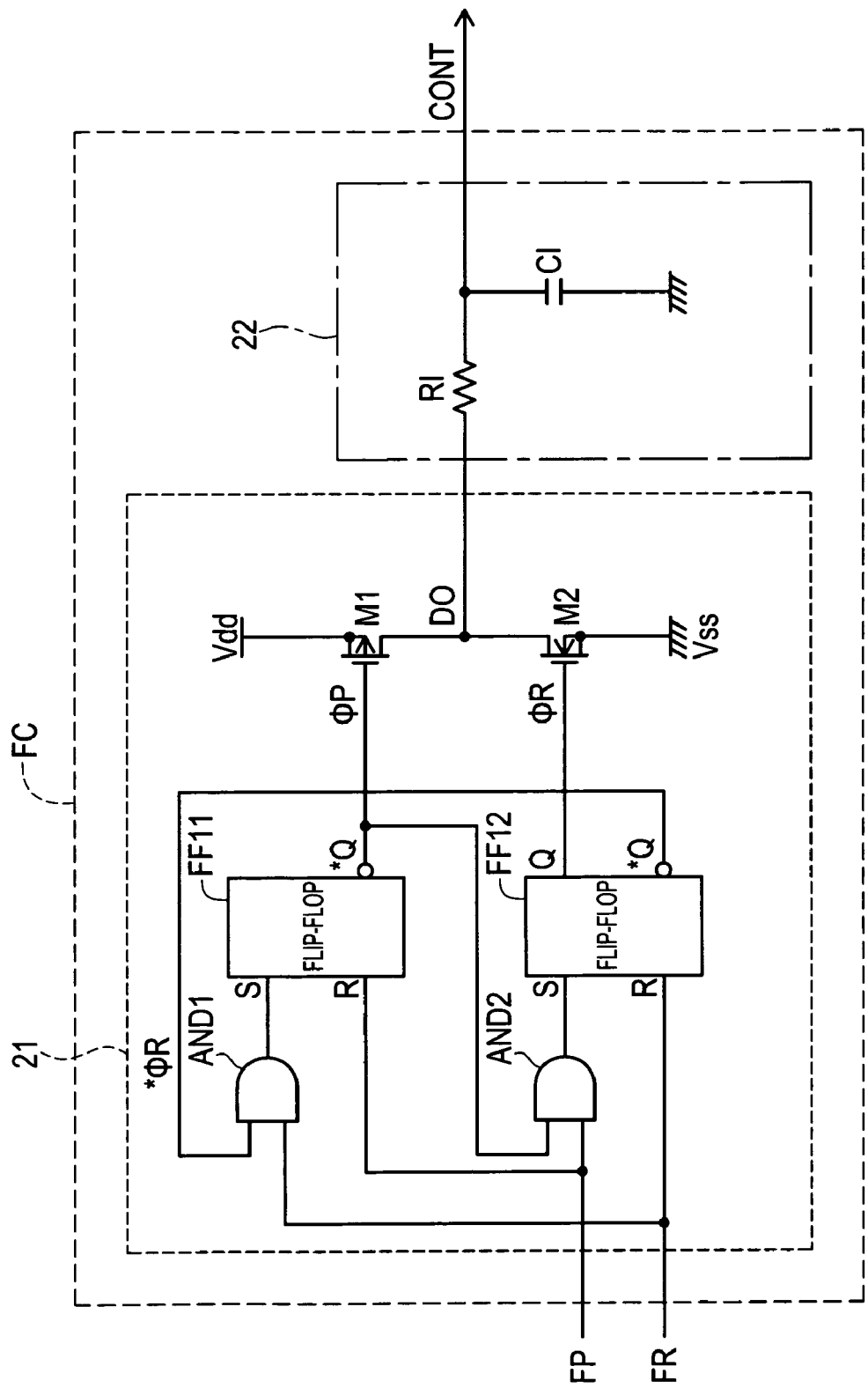
FIG. 2 is a circuit diagram of a phase comparator FC.

A constitution of the phase comparator FC is shown in FIG. 2. The phase comparator FC includes a phase detection section 21 and an integrating section 22. The phase detection section 21 includes flip-flops FF11 and FF12, AND-gates AND1 and AND2 and transistors M1 and M2. The reference clock signal FR is inputted to a reset input terminal R of the flip-flop FF12, and an output terminal of the AND-gate AND2 is connected to a set input terminal S of the flip-flop FF12. A signal ΦP outputted from an output terminal *Q of the flip-flop FF11 and the delay signal FP are inputted to the AND-gate AND2. A signal ΦR is outputted from a non-inverting output terminal Q of the flip-flop FF12. The transistors M1 and M2 are connected between a source voltage Vdd and a grounded voltage Vss. The signal ΦP is inputted to a gate of the transistor M1. The signal ΦR is inputted to a gate of the transistor M2. Drains of the both transistors are connected with each other to be connected to the integrating section 22. The integrating section 22 includes a resistance element RI and a capacitor CI. The comparison result signal CONT is outputted from the integrating section 22. A connective relationship of the flip-flop FF11 is similar to that of the flip-flop FF12, and therefore a detailed explanation thereof will be omitted.

Figure 3:
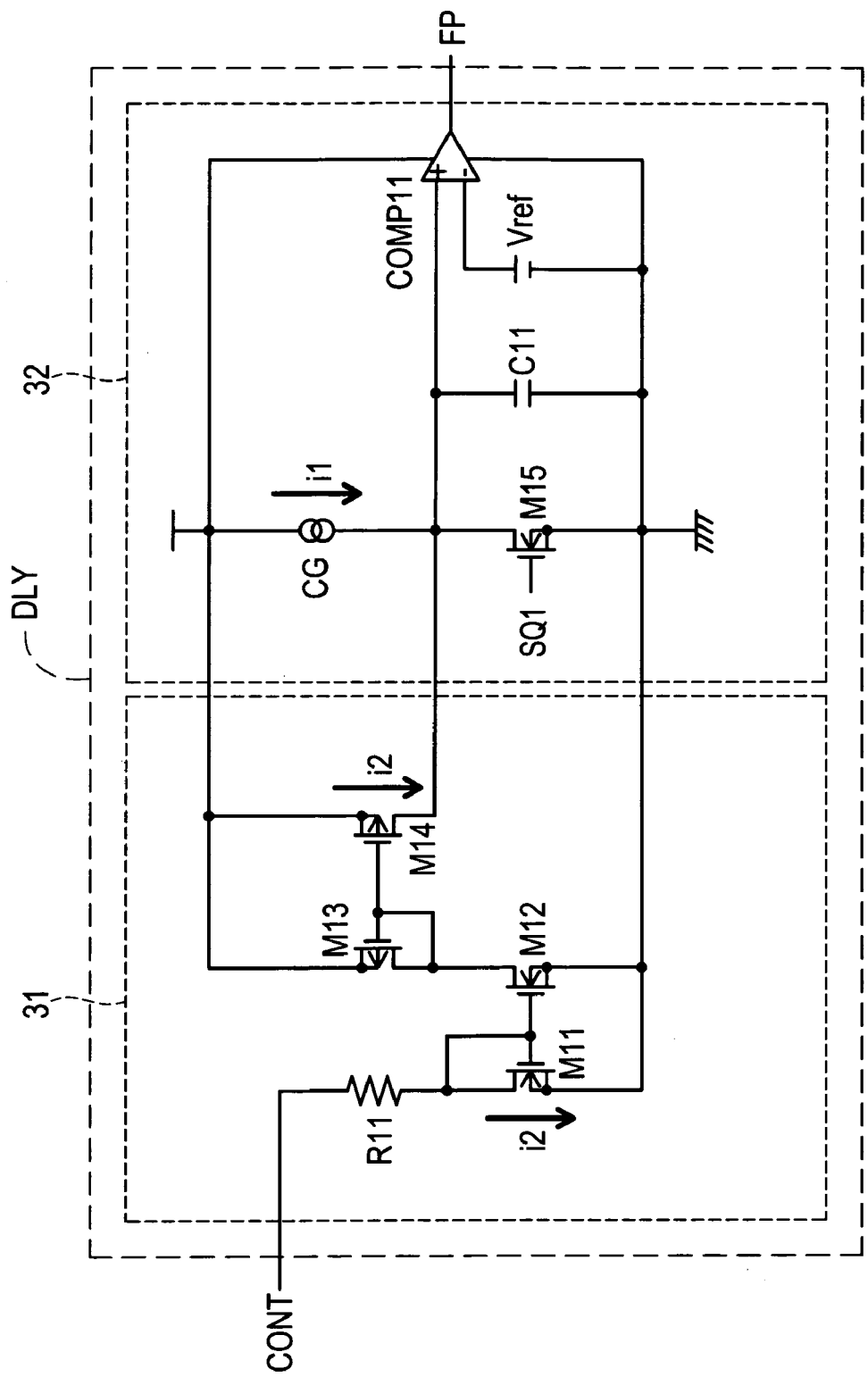
FIG. 3 is a circuit diagram of a delay circuit DLY.

A constitution of the delay circuit DLY will be explained with reference to FIG. 3. The delay circuit DLY includes a delay time control circuit 31 and a delay time generation circuit 32. The delay time control circuit 31 includes a resistance element R11 and transistors M11 to M14. The transistors M11 and M12 and the transistors M13 and M14 respectively constitute current mirror circuits. The comparison result signal CONT is inputted to the resistance element R11. The delay time generation circuit 32 includes a constant current circuit CG, a capacitor C11, a voltage comparator COMP11, a reference voltage Vref and a transistor M15. An output terminal of the constant circuit CG, a drain terminal of the transistor M15 and one end of the capacitor C11 are connected to a non-inverting input terminal of the voltage comparator COMP11. A source terminal of the transistor M15 is grounded. An output signal SQ1 is inputted to a gate terminal of the transistor M15. The reference voltage Vref is inputted to an inverting input terminal of the voltage comparator COMP11. The delay signal FP is outputted from the voltage comparator COMP11.

In advance of an explanation of the operation of the DC—DC converter 1, as a comparison therewith, the operation of a current mode control type DC—DC converter by which a switching period is completely fixed will be explained with reference to a waveform chart shown in FIG. 4. In the DC—DC converter 1 shown in FIG. 1, the current mode control type DC—DC converter of the fixed switching period has a constitution that an output signal from the oscillator OSC is inputted to the set input terminal S of the flip-flop FF. An on-timing of the transistor FET1 is controlled by the oscillator OSC.

Figure 4:
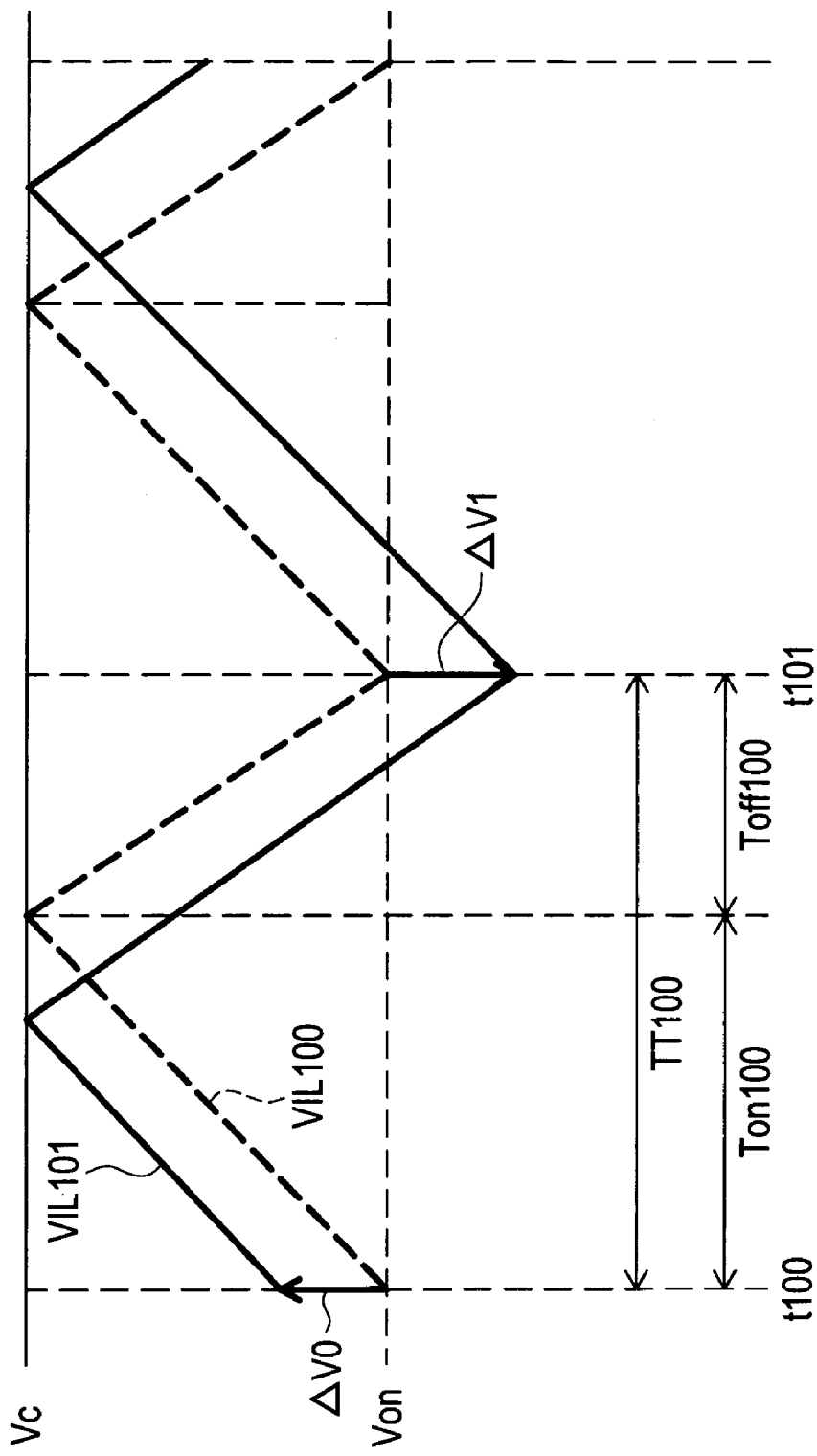
FIG. 4 is a timing chart of a current mode control type DC—DC converter.

A waveform (dot line) of an inductor current signal VIL100 is shown in FIG. 4, the signal VIL100 being in a steady state that an output voltage of the current mode control type DC—DC converter of the fixed switching period is stably outputted. A switching period TT100 is always kept fixed. All lower limit values of the inductor current signal VIL100 at times t100 and t101 when the transistor FET1 is turned on become a fixed bottom voltage Von.

In an on-time Ton100 of the transistor FET1, the inductor current signal VIL100 is increased at a tilt m1 of a linear function with the passage of time. The tilt m1 is expressed by the following expression (1) with use of the on-time Ton100 and an off-time Toff100 of the transistor FET1 and an inductance L of the choke coil L1.

$$m1=(Vin-Vout)/L \times Ton100 \qquad \text{Expression (1)}$$

On the other hand, in the off-time Toff100 of the transistor FET1, the inductor current signal VIL is decreased at a tilt m2 of a linear function. The tilt m2 is expressed by the following expression (2).

$$m2=Vout/L \times Toff100 \qquad \text{Expression (2)}$$

Assuming that a deviation amount ΔV0 from the bottom voltage Von is generated in an inductor current signal when a disturbance of an inductor current is caused by a load fluctuation at the time t100, an inductor current signal VIL101 in this case (solid line) is increased at the tilt m1 in an on-time and is decreased at the tilt m2 in an off-time. And then, a deviation amount ΔV1 from the bottom voltage Von is generated in the inductor current signal VIL101 at the next time t101. The deviation amount ΔV1 is expressed by the following expression (3).

$$\Delta V1=(m2/m1) \times \Delta V0 \qquad \text{Expression (3)}$$

When an on-duty of the transistor FET1 is not less than 50%, an absolute value of the tilt m1 is smaller than that of the tilt m2. Accordingly, the expression (3) reveals that a deviation amount from the bottom voltage Von of the inductor current signal VIL101 in the on-time of the transistor FET1 becomes large each time the transistor FET1 is turned on and does not become convergent. Therefore, a subharmonic oscillation is generated.

The operation of the DC—DC converter 1 according to the present invention will be explained with reference to FIG. 5 to FIG. 8. The DC—DC converter 1 performs the operation of a non-fixed off-time of the transistor FET1 and the operation which makes a switching frequency correspond to a clock frequency of the oscillator OSC in the steady state. On the other hand, the DC—DC converter 1 performs the operation of a fixed off-time of the transistor FET1 and the operation for preventing the subharmonic oscillation in a load fluctuation time.

Figure 5:
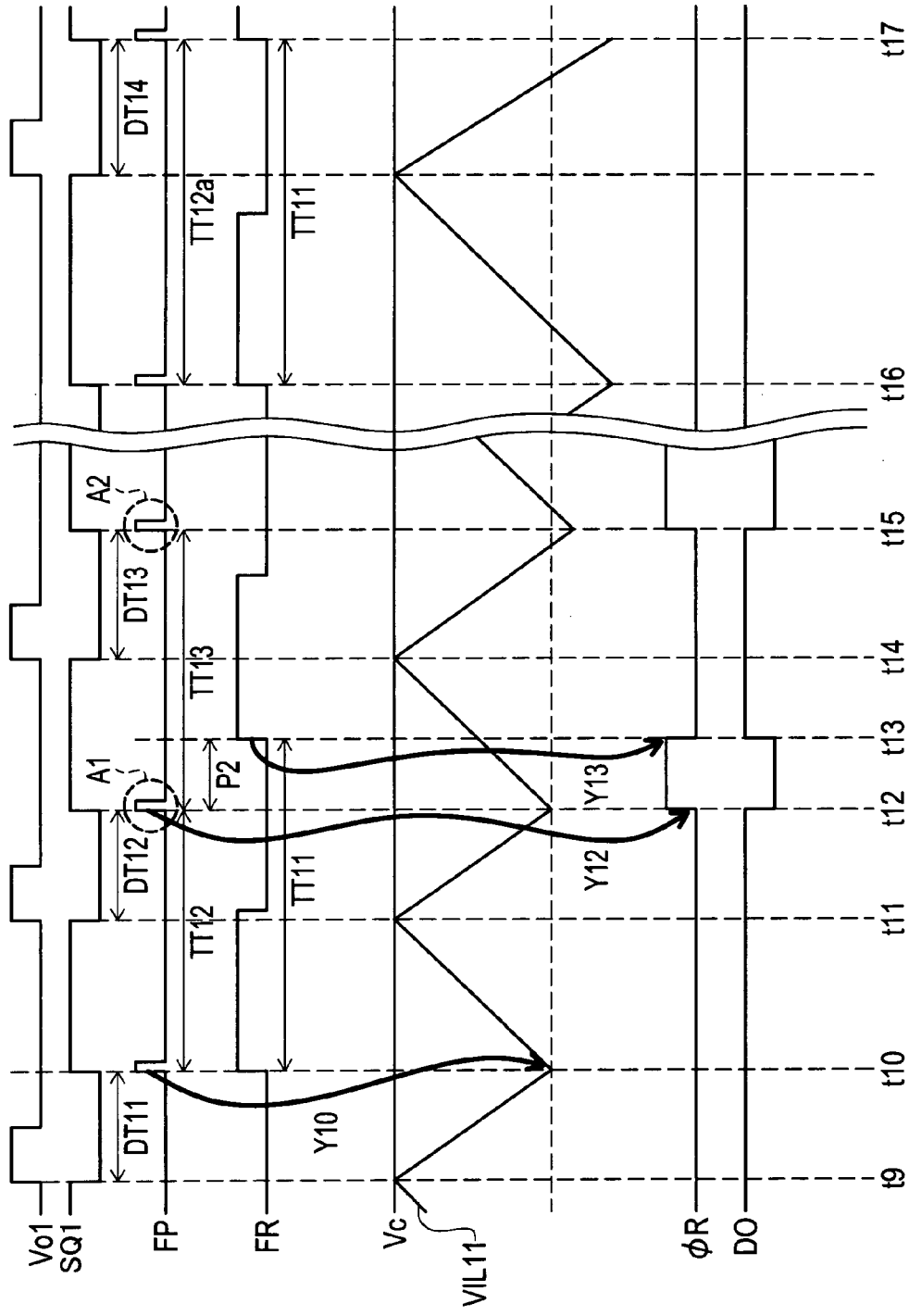
FIG. 5 is a timing chart of the DC—DC converter 1 (No. 1)

The operation of the DC—DC converter 1 being in a steady state that the output voltage Vout is stably outputted will be explained with reference to FIG. 5. A case that a switching period TT12 is shorter than a clock period TT11 of the reference clock signal FR will be explained. For expediency of explanation, a case will be explained that a phase of a rising edge of the reference clock signal FR corresponds to that of a rising edge of the delay signal FP at a time t10 and a phase of a rising edge of the delay signal FP is more advanced than that of the rising edge of the reference clock signal FR at a time t12.

When the switching period TT12 is started at the time t10, the delay circuit DLY outputs a high-level delay signal FP to set the flip-flop FF. When the flip-flop is set, the transistor FET1 is turned on and a current is supplied to a load from the input voltage Vin via the choke coil L1, therefore an inductor current signal VIL11 is raised.

(arrow Y10)

The output signal SQ1 outputted from the non-inverting output terminal Q makes a transition to high-level in accordance with that the flip-flop FF is brought into a set state. When the output signal SQ1 subjected to the transition from low-level to high-level is inputted to the delay circuit DLY, the delay circuit DLY changes the delay signal FP to low-level without delay as described below.

When a voltage value of the inductor current signal VIL11 reaches an error amplification signal Vc at a time t11, the output signal Vo1 of the voltage comparator COMP1 makes a transition from low-level to high-level. The output signal Vo1 subjected to the transition to high-level is inputted to the reset input terminal R so that the flip-flop is reset. The output signal SQ1 is turned into low-level, and the main transistor FET1 is brought into a non-conductive state. Further, an output signal SQB1 is turned into high-level, and the synchronous rectification transistor FET2 is brought into a conductive state.

When a low-level output signal SQ1 is inputted to the delay circuit DLY at the time t11, the delay signal FP as a high-level pulse signal is outputted from the delay circuit DLY at the time t12 after the passage of a prescribed delay time DT12 determined by the delay circuit DLY.

(area A1)

The operation of the delay circuit DLY from the time t11 to the time t12 will be explained with reference to FIG. 3. The delay circuit DLY is a circuit which outputs the delay signal FP as a high-level pulse signal after the passage of a prescribed delay time DT from an input of a trailing edge of the output signal SQ1. The delay circuit DLY further has performance for adjusting a value of the delay time DT in accordance with a value of the comparison result signal CONT.

A value of a delay time DT11 in the preceding period is increased or decreased in accordance with a phase difference between the reference clock signal FR and the delay signal FP at the time t10 so that a value of the delay time DT12 can be obtained as described below. Here, the phase of the reference clock signal FR and the phase of the delay signal FP are uniform at the time t10, and therefore an increase/decrease amount of the value of the delay time DT11 is zero, and the value of the delay time DT12 becomes equal to that of DT11.

Operation of the phase comparator FC from the time t12 to a time t13 will be explained with reference to FIG. 2. When a switching period TT13 is started in the time t12, the high-level delay signal FP and a high-level signal ΦP are inputted to the AND-gate AND2. Accordingly, a high-level signal outputted from the AND-gate AND2 is inputted to the set input terminal S of the flip-flop FF12. And then, the signal ΦR makes a transition to high-level (arrow Y12) so that the transistor M2 becomes conductive.

Next, a high-level reference clock signal FR delayed by a time P2 to the delay signal FP is inputted to the reset input terminal R of the flip-flop FF12 at the time t13. Accordingly, the signal ΦR makes a transition to low-level (arrow Y13) so that the transistor M2 is brought into anon-conductive state. Thus, a signal ΦR is generated by the flip-flop FF12, the signal ΦR being a positive pulse signal during the time equivalent to the time P2 corresponding to a delay amount of the phase from a rising edge of the delay signal FP to a rising edge of the reference clock signal FR. A PMW signal DO outputted from the phase detection section 21 is turned into low-level while the signal ΦR is high-level. That is, the phase detection section 21 serves as a PWM circuit which outputs a low-level signal during the time difference when the phase of the delay signal FP is more advanced than the phase of the reference clock signal FR.

A capacitor CI of the integrating section 22 is discharged in the time P2 in accordance with an input of a low-level PMW signal DO. Accordingly, a voltage value of the comparison result signal CONT outputted from the integrating section 22 lowers in accordance with the PMW signal DO.

The operation of the delay circuit DLY from a time t14 to a time t15 will be explained with reference to FIG. 3. The comparison result signal CONT is inputted to the delay time control circuit 31 of the delay circuit DLY. A current i2 in prosection to the comparison result signal CONT flows through the transistor M11. Since the transistor M11 and M12 constitute the current mirror circuit, the current i2 flows through the transistor M12. A current flowing through the transistor M12 and a current flowing through the transistor M13 are the same, so the current i2 flows through the transistor M13. The current i2 further flows through the transistor M14 since the transistor M13 and M14 constitute the current mirror circuit. Since the transistor M14 is connected in parallel with the constant current circuit CG, a current charging a capacitor C11 of the delay circuit is equal to the total of a current i1 flowing through the constant current circuit CG and the current i2.

When the output signal SQ1 makes a transition from high-level to low-level at the time t14, the transistor M15 is turned off. Therefore, the capacitor C11 is charged by the current i1 flowing through the constant current circuit CG and the current i2. A voltage of the capacitor C11 is raised for a time determined by the i1 and i2 fed into the capacitor C11 and a time constant of the capacitor C11. When the voltage of the capacitor C11 becomes equal to or more than the reference voltage Vref, the voltage comparator COMP11 outputs the high-level delay signal FP, and a delay time DT13 ends. That is, the delay time DT is determined by a charging time of the capacitor C11. Further, when a voltage value of the comparison result signal CONT becomes higher, the current i2 is increased so that the delay time DT is shortened. Furthermore, when the voltage value of the comparison result signal CONT becomes lower, the current i2 is decreased so that the delay time DT is prolonged. Here, the voltage value of the comparison result signal CONT at the time t14 is lower than the voltage value of the comparison result signal CONT at the time t11 in accordance with a length of the time P2. Accordingly, the delay time DT13 becomes longer than the delay time DT12.

As described above, in the control section 3, a feed-back control is performed that the delay time DT13 in the current switching period TT13 is adjusted in accordance with a phase difference between the delay signal FP and the reference clock signal FR in the switching period TT12 before the current switching period TT13. Thus, after the passage of a certain amount of time, as shown from a time t16 to a time t17, a delay time DT14 can be obtained that the clock period TT11 of the reference clock signal FR corresponds to a period TT12a of the delay signal FP and that a phase difference between the reference clock signal FR and the delay signal FP becomes zero.

Figure 6:
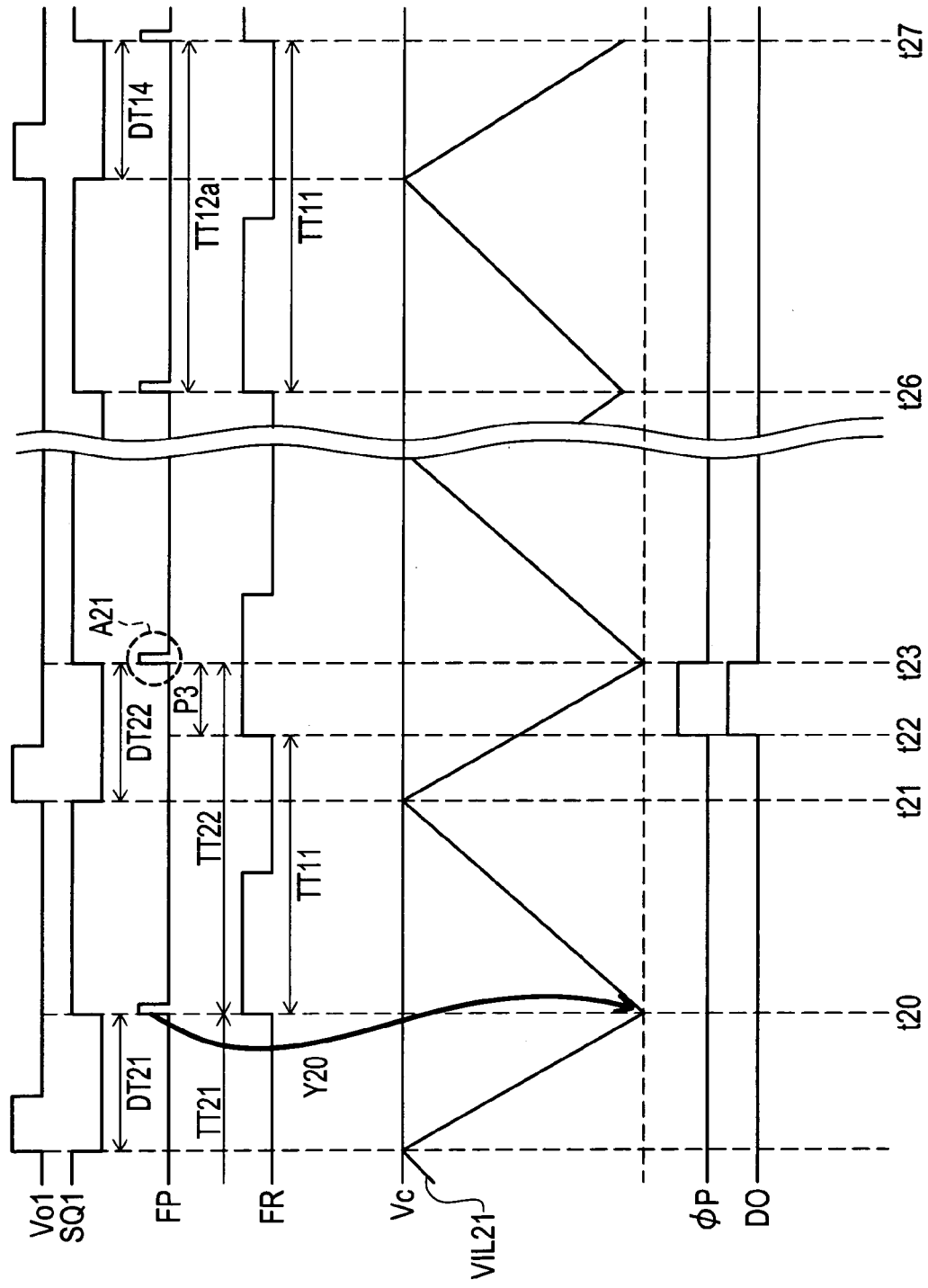
FIG. 6 is a timing chart of the DC—DC converter 1 (No. 2)

Next, in the steady state that the output voltage Vout is stably outputted, the operation of the DC—DC converter 1 when a switching period TT22 is longer than the clock period TT11 of the reference clock signal FR will be explained with reference to FIG. 6. At a time t20, the delay circuit DLY outputs the high-level delay signal FP to set the flip-flop FF so that an inductor current signal VIL21 is raised (arrow Y20). At a time t21, the flip-flop FF is reset, and the low-level output signal SQ1 is inputted to the delay circuit DLY. And then, at a time t23 after the passage of a prescribed delay time DT22 determined by the delay circuit DLY, a delay signal FP as a high-level pulse signal is outputted from the delay circuit DLY (area A21).

As described below, a value of a delay time DT21 in a preceding switching period TT21 is increased or decreased in accordance with a phase difference between the reference clock signal FR and the delay signal FP at the time t20 so that a value of the delay time DT22 can be obtained. The phase of the reference clock signal FR and the phase of the delay signal FP are uniform at the time t20, therefore an increase/decrease amount of the value of the delay time DT21 becomes zero. Accordingly, the value of the delay time DT22 becomes equal to the value of the delay time DT21.

The phase comparator FC can generate a signal ΦP, which is a positive pulse signal during the time equivalent to a time P3 corresponding to a delay amount of the phase of the delay signal FP from the reference clock signal FR, from a time T22 to the time T23. The PMW signal DO outputted from the phase detection section 21 is turned into high-level while the signal (DP is high-level. Accordingly, the voltage value of the comparison result signal CONT outputted from the integrating section 22 is raised in accordance with the PMW signal DO, therefore a delay time in a switching period from the time t23 becomes shorter than the delay time DT22.

After the passage of a certain amount of time from the time t22 when a deviation between the phases is generated, as shown from a time t26 to a time t27, the delay time DT14 can be obtained that the clock period TT11 of the reference clock signal FR corresponds to the period TT12a of the delay signal FP and a phase difference between the reference clock signal FR and the delay signal FP becomes zero, by the above-described feed-back control.

Figure 7:
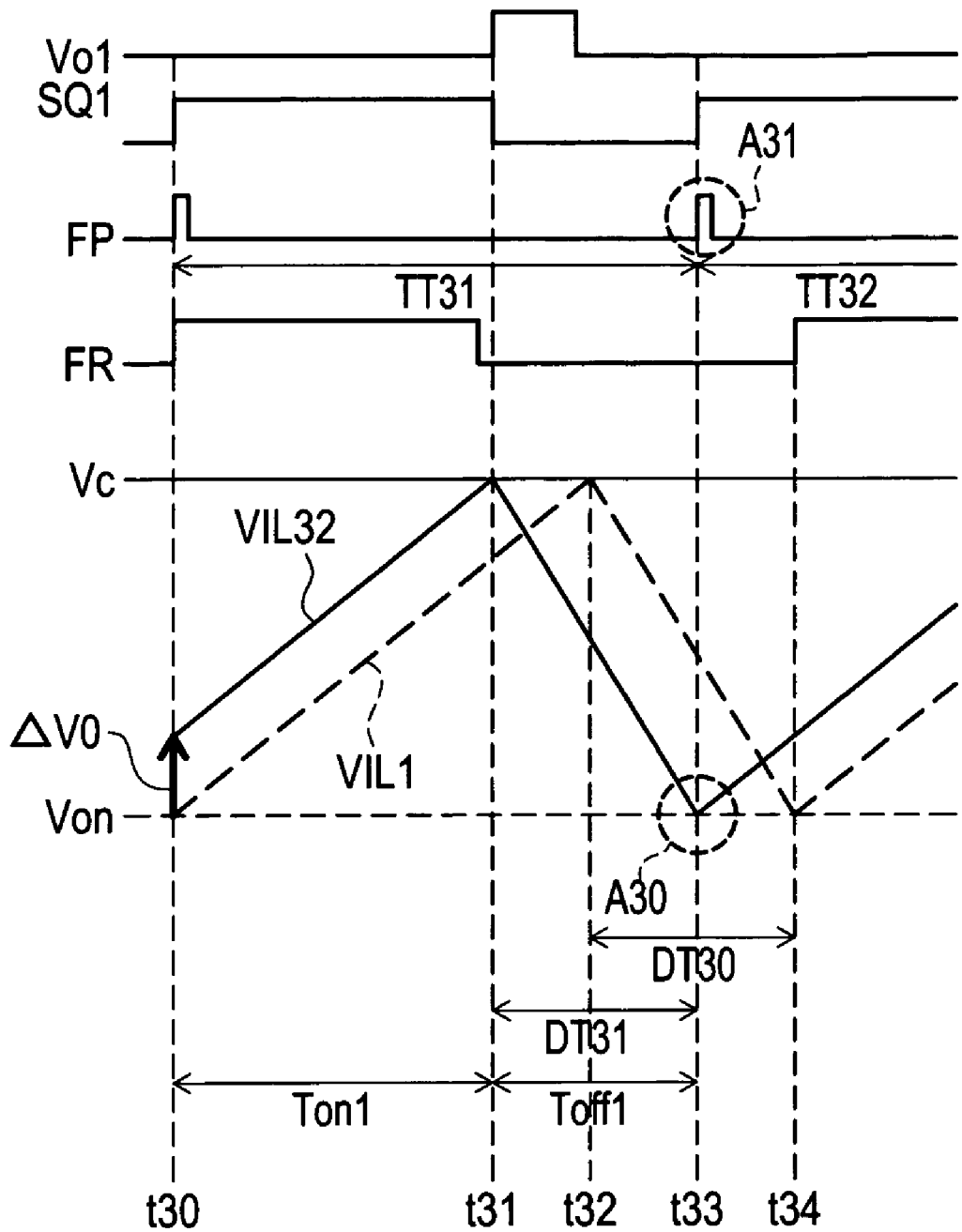
FIG. 7 is a timing chart of the DC—DC converter 1 (No. 3)

Next, the operation of the DC—DC converter 1 when a disturbance of the inductor current is caused by a load fluctuation, etc., will be explained with reference to FIG. 7. For expediency of explanation, a case will be explained that the load fluctuation is generated when a phase of a rising edge of the reference clock signal FR corresponds to that of a rising edge of the delay signal FP.

Assuming that an inductor current signal VIL1 (broken line) being in a steady state is changed to an inductor current signal VIL32 (solid line) by increase of an inductor current signal by a deviation amount ΔV0 from the bottom voltage Von at a time 30, the inductor current signal VIL32 is increased at the tilt m1 in an on-time Ton1 of the transistor FET1. When a voltage value of the inductor current signal VIL32 reaches the error amplification signal Vc at a time t31, the output signal Vo1 of the voltage comparator COMP1 makes a transition from low-level to high-level, the flip-flop FF is reset, and the output signal SQ1 is inverted into low-level. The output signal SQ1 is turned into low-level during a prescribed delay time DT31 determined by the delay circuit DLY, the transistor FET1 is turned off during the delay time DT31. Further, the inductor current signal VIL32 is decreased at the tilt m2 during the delay time DT31.

The delay time DT31 in a switching period TT31 can be obtained by feed-back of a phase difference between a timing signal and a clock signal in a period before the switching period TT31. Accordingly, even if a phase difference between the delay signal FP and the reference clock signal FR is caused by the load fluctuation, etc., in the switching period TT31, the delay time DT31 in the switching period TT31 does not fluctuate to become equal to a delay time DT30. Further, the inductor current signal VIL32 is decreased at the tilt m2 during the delay time DT31 so that a value of the inductor current signal VIL32 becomes equal to the bottom voltage Von at a time t33 when the delay time DT31 ends (area A30). Thus, a deviation amount of the inductor current signal VIL32 from the bottom voltage Von during the on-time of the transistor FET1 generated at the time t30 is converged at the time t33.

As explained in detail above, in the DC—DC converter 1 according to the first embodiment, a feed-back control is performed that the delay time DT in the current switching period is adjusted in accordance with a phase difference between the delay signal FP and the reference clock signal FR in a switching period before the current switching period. Thus, transmission of a disturbance of an inductor current generated by a load fluctuation in the current switching period to the succeeding switching periods can be prevented. And thus, a subharmonic oscillation can be prevented even if an on-duty is not less than 50% in the control circuit of the current mode control type DC—DC converter operating at the fixed frequency.

Further, an off-time Toff can be adjusted so that a clock period of the reference clock signal FR corresponds to a switching period of the DC—DC converter and that the phase of rising edge of the reference clock signal FR and a phase of a rising edge of a switching timing become uniform. Accordingly, the switching period of the DC—DC converter provided with the control circuit of the DC—DC converter according to the present invention can be synchronized with the clock period. Further, the switching period can be prevented from fluctuating depending on the input voltage Vin.

That is, the control circuit of current mode control type DC—DC converter according to the present invention controls the main switching transistor FET1 in accordance with the reference clock signal FR being in the steady state that the output voltage of the DC—DC converter is stably outputted, therefore an off-time is not fixed, and therefore a switching frequency can be synchronized with the reference clock signal FR. On the other hand, off-times are fixed every switching period by the feed-back control between the phase comparator FC and the delay circuit DLY during the over response when an output current is changed by the load fluctuation so that the subharmonic oscillation can be prevented. Since the off-time is thus brought into a semi-fixed state, the subharmonic oscillation can be prevented even if the on-duty of the transistor FET1 is not less than 50%, and the switching frequency can be prevented from fluctuating depending on the input voltage Vin.

Figure 8:
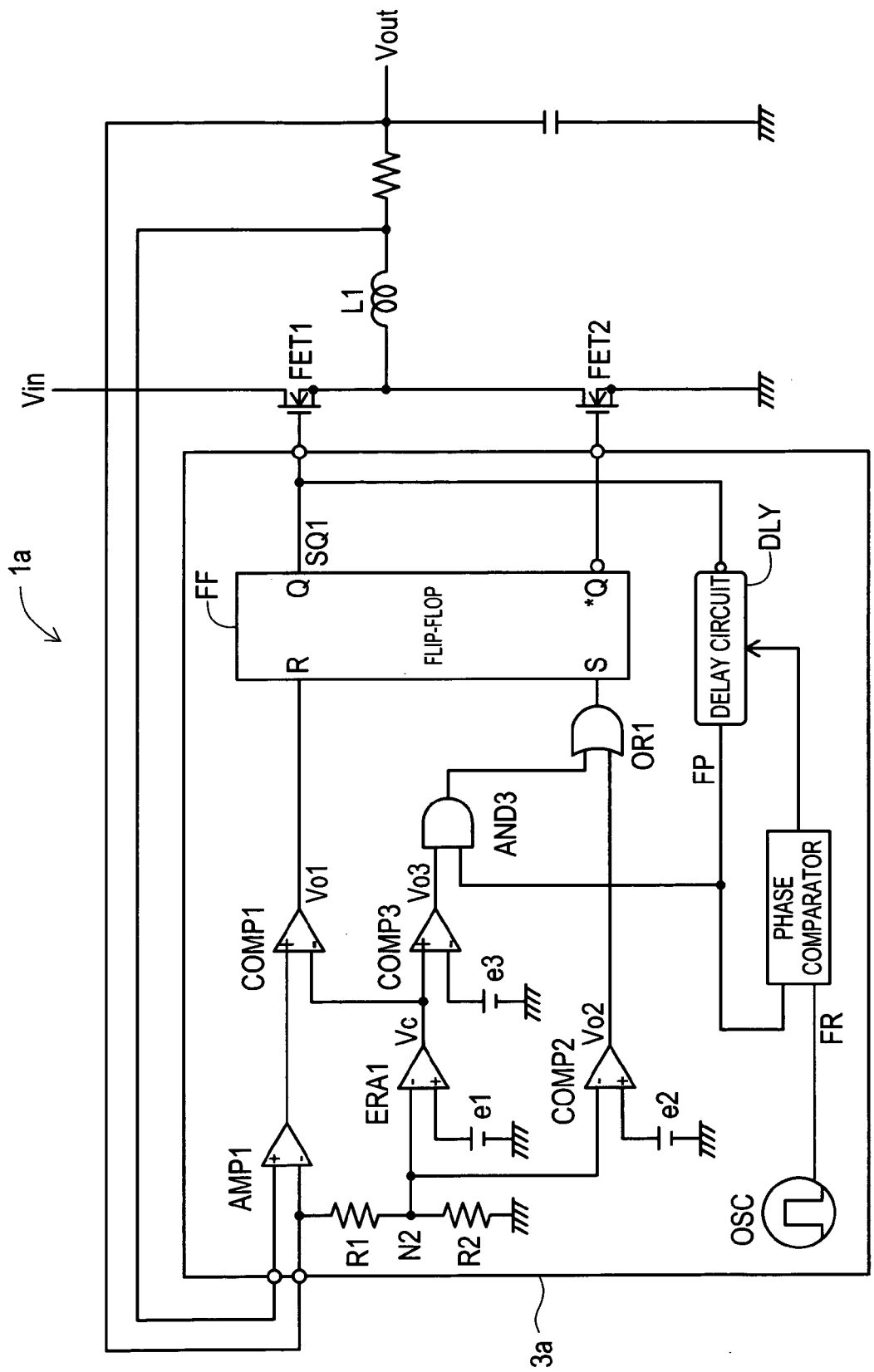
Figure 9:
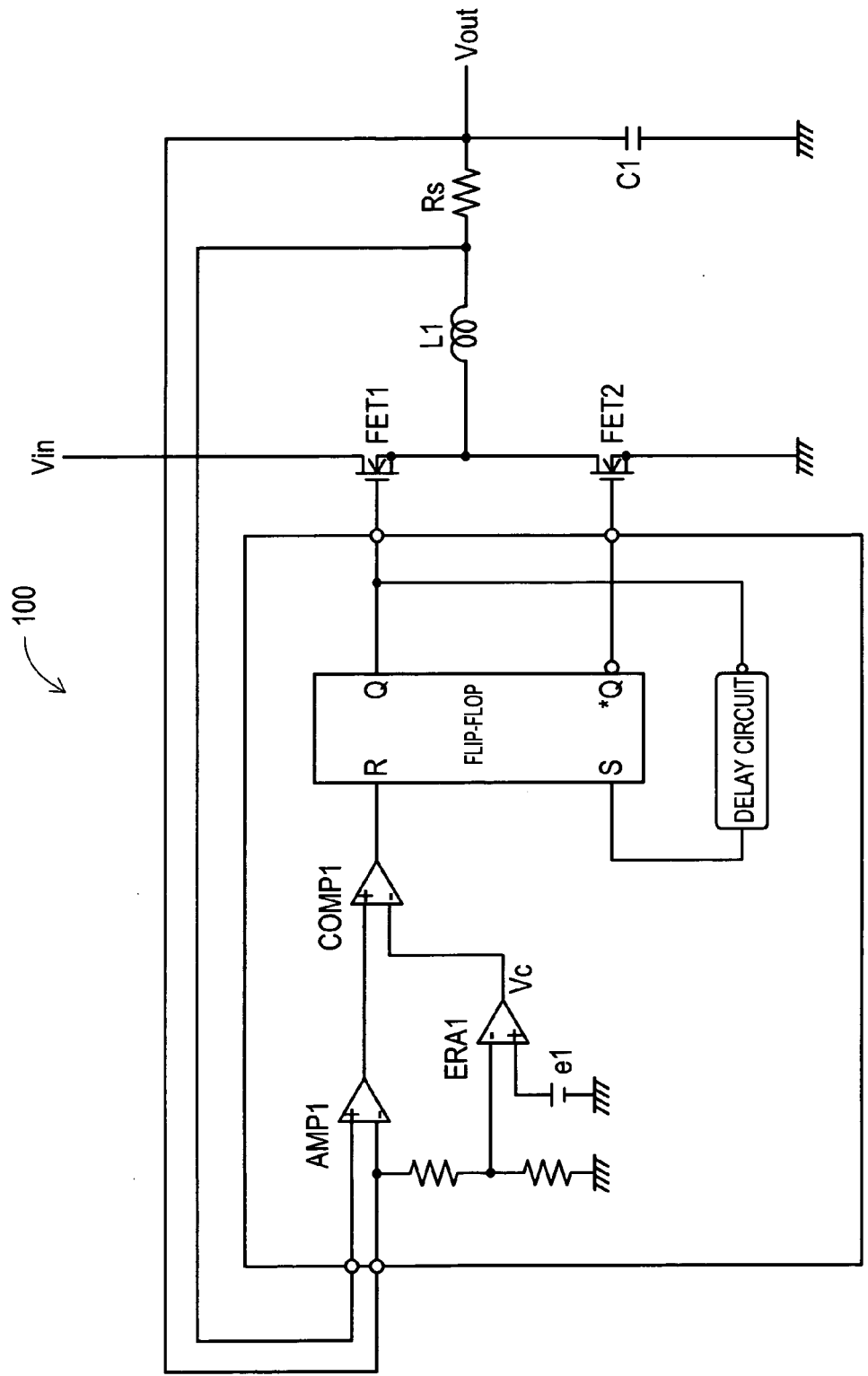
FIG. 9 is a circuit diagram of a current mode DC—DC converter 100 of fixed off-time control.

A DC—DC converter 1a according to a second embodiment of the present invention will be explained with reference to FIG. 8. A control circuit of the DC—DC converter 1a includes a control section 3a in place of the control section 3 of the DC—DC converter 1 shown in FIG. 1. The control section 3a further includes voltage comparators COMP2 and COMP3, an AND-gate AND3 and OR-gate OR1 to the control section 3.

An output terminal of the error amplifier ERA1 is connected to the inverting input terminal of the voltage comparator COMP1 and a non-inverting input terminal of the voltage comparator COMP3. A reference voltage e3 is connected to an inverting input terminal of the voltage comparator COMP3. An output terminal of the voltage comparator COMP3 is connected to one input terminal of the AND-gate AND3, and the output terminal of the delay circuit DLY is connected to the other input terminal of the AND-gate AND3. The node N2 is connected to an inverting input terminal of the voltage comparator COMP2, and the reference voltage e2 is connected to a non-inverting input terminal of the voltage comparator COMP2. An output terminal of the AND-gate AND3 and an output terminal of the voltage comparator COMP2 are connected to an input terminal of the OR-gate OR1. An output terminal of the OR-gate OR1 is connected to the set input terminal S of the flip-flop FF. Output signals of Vo2 and Vo3 are respectively outputted from the voltage comparators COMP2 and COMP3. Each of the reference voltages e2 and e3 has an individual prescribed value. Moreover, other constitutions are similar to those of the control section 3 shown in FIG. 1, and therefore a detailed explanation thereof will be omitted hereinafter.

Action by the voltage comparator COMP2 will be first explained. The voltage comparator COMP2 is a circuit which aims to enable the DC—DC converter 1a to respond to a sudden load fluctuation at high speed. When the output voltage Vout of the DC—DC converter is reduced by the sudden load fluctuation in an off-time Toff after a high-level output signal Vo1 is inputted to the reset input terminal R of the flip-flop FF until the high-level delay signal FP is inputted to the set input terminal S of the flip-flop FF, the divided voltage value of the output voltage Vout at the node N2 is reduced in accordance with the reduction of the output voltage Vout. When the divided voltage value becomes less than the reference voltage e2 in the off-time Toff, a high-level output signal Vo2 is outputted from the voltage comparator COMP2. Moreover, the reference voltage e2 is a voltage value previously determined in accordance with a lower limit value of the output voltage Vout. And then, the high-level output signal Vo2 is inputted to the set input terminal S before a timing of input of the high-level delay signal FP. Thus, the flip-flop FF is forcibly set before the passage of the off-time Toff, and the off-time Toff is forcibly terminated.

When the flip-flop FF is forcibly set in the passage of the off-time Toff, the output signal SQ1 makes a transition from low-level to high-level, and a high-level output signal SQ1 is inputted to the delay circuit DLY. The transistor M15 (see FIG. 3) becomes conductive in accordance with the high-level output signal SQ1, and the capacitor C11 brought into a charging state is immediately discharged. Accordingly, a delay time generated in the delay circuit DLY is cancelled, and the delay signal FP is kept-low-level. Afterward, the high-level output signal Vo1 is inputted to the reset input terminal R so that the flip-flop FF is reset. Thereafter, the above-described operations are repeated.

Thus, in the DC—DC converter 1a, when the output voltage Vout of the DC—DC converter becomes lower than the prescribed value determined at the reference voltage e2 during the off-time Toff, the transistor FET1 can be forcibly brought in to an on-state. Accordingly, a high-speed response to the sudden load fluctuation can be realized.

Next, action by the voltage comparator COMP3 and the AND-gate AND3 will be explained. These circuits are circuits which aim to prevent the output voltage Vout from rising during the low load. The error amplifier ERA1 amplifies a difference between the divided voltage value at the node N2 of the output voltage Vout and the reference voltage e1 to output the error amplification signal Vc. The voltage comparator COMP3 compares the error amplification signal Vc with the reference voltage e3. Here, the reference voltage e3 is a voltage previously determined in accordance with an upper limit value of the output voltage Vout. When the output voltage Vout is higher than the upper limit value, the error amplification signal Vc becomes lower than the reference voltage e3, and the voltage comparator COMP3 outputs a low-level output signal Vo3. When the low-level output signal Vo3 is inputted to the AND-gate AND3, the AND-gate AND3 masks the delay signal FP. As a result, the off-time Toff of the transistor FET1 ends. Further, even if the high-level delay signal FP is outputted from the delay circuit DLY, the delay signal FP is masked, and therefore the flip-flop FF is maintained in a reset state and the transistor FET1 is maintained in an off-state. Accordingly, the output voltage Vout of the DC—DC converter can be prevented from rising.

When the output voltage Vout of the DC—DC converter 1a becomes lower than the upper limit value, the error amplification signal Vc becomes higher than the reference voltage e3, and the voltage comparator COMP3 outputs a high-level output signal Vo3. And then, the AND-gate AND3 stops masking the delay signal FP. Accordingly, the flip-flop FF is brought into a set state in accordance with the high-level delay signal FP, and the output voltage Vout of the DC—DC converter is raised.

The effects will be explained. In the DC—DC converter 1 shown in FIG. 1, the switching period of the transistor FET1 is controlled so as to correspond to the period of the reference clock signal FR of the oscillator OSC. Accordingly, even if the DC—DC converter 1 is in a non-load state, the transistor FET1 is periodically brought into a conductive state. And then, the whole energy stored in the choke coil L1 is used only for raising a voltage of the smoothing capacitor C1 so that the output voltage Vout rises above a set voltage value. On the other hand, in the DC—DC converter 1a shown in FIG. 8, the transistor FET1 can be forcibly maintained in the off-state by the voltage comparator COMP3 and the AND-gate AND3 during the rising time when the output voltage Vout exceeds a set value set at the reference voltage e3. Accordingly, the output voltage Vout can be prevented from rising above the set voltage value.

As explained in detail above, first, in the DC—DC converter 1a according to the second embodiment, when the output voltage Vout of the DC—DC converter is reduced by the sudden load fluctuation, the transistor FET1 can be forcibly brought into the on-state even if being in the off-time Toff. Accordingly, the high-speed response to the sudden load fluctuation can be realized. Secondly, in the rising time when the output voltage Vout exceeds the set value set at the reference voltage e3, the transistor FET1 can be forcibly maintained in the off-state. Accordingly, the output voltage Vout can be prevented from rising above the set voltage value.

Moreover, it is obvious that the present invention is not limited to the embodiments described above, and that various improvements and modifications can be performed without departing from the scope of the present invention. The fixed off-time type current mode control system DC—DC converter is explained in the present embodiments, but the present invention is not limited thereto. It is obvious that the present invention is also applicable to a fixed on-time type current mode control system DC—DC converter. In this case, in the DC—DC converter 1 shown in FIG. 1, the error amplifier ERA1 is connected to the non-inverting input terminal of the voltage comparator COMP1, and the voltage amplifier AMP1 is connected to the inverting input terminal of the voltage amplifier AMP1. The output terminal of the voltage comparator COMP1 is connected to the set input terminal S of a flip-flop FF1. The non-inverting output terminal Q is connected to the output terminal DH, and further connected to the reset input terminal R of the flip-flop FF1 via the delay circuit DLY. Moreover, other constitutions are similar to those of the DC—DC converter 1, and therefore an explanation in detail will be omitted hereinafter.

When the inductor current signal VIL is reduced to the error amplification signal Vc, the voltage comparator COMP1 outputs the high-level input signal Vo1 to set the flip-flop FF1. Then, the flip-flop FF1 is reset in accordance with that the delay circuit DLY outputs the high-level delay signal FP after the passage of the delay time DT. The fixed on-time type DC—DC converter is constituted by repeating these operations.

The voltage comparator COMP11 is employed in an output step in the delay circuit DLY of the present embodiment (see FIG. 3), but the present invention is not limited thereto. A driver circuit may be employed in place of the voltage comparator COMP11. When the output signal SQ1 is in a high-level state, a ground potential is inputted to the driver circuit so that a low-level delay signal FP is outputted from the driver circuit. When a voltage of the capacitor C11 becomes equal to or more than a threshold voltage of the driver circuit after the passage of a prescribed time from a transition of the output signal SQ1 to low-level, a high-level delay signal FP is outputted from the driver circuit. Thus, the circuit can be simplified.

A step-down DC—DC converter is explained in the present embodiments. Here a point of the present invention is that the feed-back control is performed that the delay time DT in the current switching period is adjusted in accordance with the phase difference between the delay signal FP and the reference clock signal FR in a switching period before the current switching period. Accordingly, it is obvious that the present invention is also applicable to a step-up DC—DC converter.

Moreover, the delay signal FP is an example of a timing signal, the delay circuit DLY is an example of a timing adjustment circuit, the reference clock signal FR is an example of a clock signal, the comparison result signal CONT is an example of a phase difference signal, the transistor M2 is an example of a second switch, the transistor M1 is an example of a third switch, the reference voltage Vref is an example of a first set voltage, the reference voltage e2 is an example of a second set voltage, the voltage comparator COMP11 is an example of a first comparator, the voltage comparator COMP2 is an example of a second comparator and the voltage comparator COMP3 is an example of a monitoring circuit.

According to a control circuit and a control method for the current mode control type DC—DC converter of the present invention, the subharmonic oscillation can be prevented even if the on-duty of the main switching transistor is not less than 50%, and the switching frequency can be prevented from fluctuating depending on the input voltage.

What is claimed is:

1. A control circuit of a current mode control type DC—DC converter that controls a main switching transistor in accordance with a clock signal, comprising:
 a timing adjustment circuit that outputs a timing signal for determining a timing for shifting the main switching transistor from a second state to a first state; and
 a phase comparator that detects a phase difference between the timing signal and the clock signal to output a phase difference signal to the timing adjustment circuit in accordance with the phase difference, wherein the timing adjustment circuit prolongs a delay time after the main switching transistor shifts from the first state to the second state until the timing adjustment circuit outputs the timing signal in accordance with an advance amount of a phase when the phase of the timing signal is more advanced than a phase of the clock signal, and the timing adjustment circuit shortens the delay time in accordance with a delay amount of a phase when the phase of the timing signal is delayed behind a phase of the clock signal.

2. The control circuit of a current mode control type DC—DC converter according to claim 1, wherein
 the first state is a conductive state,
 the second state is a non-conductive state, and
 the main switching transistor shifts from the first state to the second state in accordance with that an inductor current becomes higher than a set value.

3. The control circuit of a current mode control type DC—DC converter according to claim 1, wherein
 the first state is a non-conductive state,
 the second state is a conductive state, and
 the main switching transistor shifts from the first state to the second state in accordance with that an inductor current becomes lower than a set value.

4. The control circuit of a current mode control type DC—DC converter according to claim 1, wherein
 an gate input signal inputted to a gate terminal of the main switching transistor is inputted to the timing adjustment circuit, and
 the timing adjustment circuit gives the delay time to an edge of the gate input signal to shift the main switching transistor from the first state to the second state, and outputs the edge given the delay time as the timing signal.

5. The control circuit of a current mode control type DC—DC converter according to claim 4, wherein the timing adjustment circuit comprises:
 a current source that changes a current amount in accordance with the phase difference signal;
 a capacitor that is connected in series with the current source and of which an end is grounded;
 a first switch that is brought into a non-conductive state in accordance with that the main switching transistor is brought into the second state and that is brought into a conductive state in accordance with that the main switching transistor is brought into the first state, the first switch being connected in parallel with the capacitor and the gate input signal inputted to the first switch; and
 a first comparator that outputs a comparison result of a voltage of the capacitor and a first set voltage.

6. The control circuit of a current mode control type DC—DC converter according to claim 1, wherein
 the phase comparator comprises:
 an integrating section;
 a second switch that connects the integrating section with a grounded voltage; and
 a third switch that connects the integrating section with a source voltage, and
 the phase comparator makes the second switch a conductive state in accordance with an advance amount of a phase when the phase of a rising edge of the timing signal is more advanced than a phase of a rising edge of the clock signal and makes the third switch a conductive state in accordance with a delay amount of a phase when the phase of a rising edge of the timing signal is delayed behind a phase of a rising edge of the clock signal.

7. The control circuit of a current mode control type DC—DC converter according to claim 1, further comprising a second comparator that is connected between an input terminal of a flip-flop for controlling the main switching transistor to which the timing signal is inputted and an output terminal of a DC—DC converter and that outputs the same level signal as the timing signal to the input terminal to which the timing signal is inputted in accordance with that an output voltage of the DC—DC converter exceeds a second set voltage.

8. The control circuit of a current mode control type DC—DC converter according to claim 1, further comprising a monitoring circuit to which an error amplification signal obtained by an amplification of an error between a third set voltage and an output voltage of a DC—DC converter, a fourth set voltage and the timing signal are inputted, which inputs the timing signal to the input terminal to which the input timing signal of the flip-flop for controlling the main switching transistor is inputted in a time when the error amplification signal is higher than the fourth set voltage and that masks the timing signal in a time when the error amplification signal is lower than the fourth set voltage.

9. A control method for a current mode control type DC—DC converter for controlling a main switching transistor in accordance with a clock signal, comprising the steps of:

detecting a phase difference between a shift timing when the main switching transistor shifts from a second state to a first state and the clock signal;

shifting the main switching transistor from the first state to the second state in accordance with that an inductor current exceeds a set value after the shift of the main switching transistor to the first state; and delaying the shift timing in accordance with an advance amount of a phase when the phase of the previous shift timing is more advanced than a phase of the clock signal, and bringing the shift timing forward in accordance with an advance amount of a phase when the phase of the previous shift timing is delayed behind a phase of the clock signal, at the subsequent determination of the shift timing.

* * * * *